UNITED STATES PATENT OFFICE.

ORRIN A. WHEELER, OF AUSTIN, ILLINOIS, ASSIGNOR TO HIMSELF, AND FRED W. GARLICK, CHARLES I. BEAR, AND WILLIAM A. VAIL, OF CHICAGO, ILLINOIS.

ART OR PROCESS OF RECLAIMING SCRAP OR WASTE VULCANIZED RUBBER.

No. 866,759.   Specification of Letters Patent.   Patented Sept. 24, 1907.

Application filed October 15, 1906. Serial No. 338,978.

*To all whom it may concern:*

Be it known that I, ORRIN A. WHEELER, a citizen of the United States, residing in Austin, in the county of Cook and State of Illinois, have invented a new and useful Improvement in the Art or Process of Reclaiming Scrap or Waste Vulcanized Rubber, of which the following is a specification.

My invention relates to the art or process of reclaiming scrap or waste vulcanized rubber.

The usual methods or processes heretofore employed in reclaiming scrap or waste rubber are slow and expensive in operation and result in a product of inferior quality, unfit for many uses. The old methods or processes in practical use consist essentially in heating it in large quantities or masses in water or steam for a considerable time, usually from 10 to 26 hours, the scrap or waste being first ordinarily ground. Owing to the poor heat conducting qualities of the ground waste rubber difficulty is experienced in heating the large bulk of ground wet rubber to the proper degree throughout the mass to produce plasticity; and the outer portions are, necessarily, heated for a much longer time than necessary, while the inner portions may be insufficiently heated to produce the desired result. And owing to the well known fact that all vulcanized rubber contains free sulfur, the prolonged heating produces a further vulcanizing action which is very injurious to the product; and after the mass of ground rubber waste has thus been heated in steam or water it requires to be cooled and dried, a laborious and expensive operation, which is frequently performed by forcing air through the hot wet rubber, thus resulting in material injury by oxidation which is engendered and facilitated by the heat and air; oxidation being, as is well known, the greatest foe of india rubber. The inferiority of the reclaimed india rubber, produced by the reclaiming methods or processes heretofore in use, to the native or new article, is largely due to vulcanization and oxidation taking place during the reclaiming operation, it being well known that all commercial reclaimed rubber produced by the methods or process heretofore in use contains combined sulfur.

The object of my invention is to provide a simple and efficient method or process for reclaiming scrap or waste vulcanized rubber which will be rapid and inexpensive in operation, which will result in the production of a superior quality of reclaimed rubber, but slightly inferior to the new or natural article, and by which the reclaiming operation may be carried out without further vulcanization of the rubber and without oxidation taking place, and whereby the tedious, troublesome and expensive cooling and drying operation or step of the processes heretofore in use may be entirely dispensed with, and whereby the reclaiming operation may be effected without the use of solvents, acids, alkalies or chemicals of any kind whatsoever, and without the use of water or steam or other application of moisture to the rubber stock being treated; although it is well known that ground scrap or waste rubber cannot be heated in a dry state in mass or large amounts hot enough to reclaim the same, as the outside of the dry mass would melt or burn before the inside would get warm at all.

My invention consists in the means or method herein described by which I practically accomplish this object or result.

My invention consists in or is based upon my discovery, made after long and extensive experimenting, that such waste or scrap vulcanized rubber may be practically reclaimed or given the necessary plasticity for reworking and revulcanization by quickly bringing the old rubber stock, preferably in a ground or comminuted condition, to a degree of heat just above the limits of the vulcanization range and below that of fusion, and that the duration of this temperature for the shortest possible time, a few minutes, produces the best results, the rubber stock being then quickly cooled, preferably to the temperature suitable for sheeting, and preferably passed directly to the sheeting rolls. I thus entirely prevent any further vulcanization of the old rubber stock during the reclaiming operation, as considerable time is necessary to enable any appreciable vulcanizing action to take place; and by thus applying heat in this manner to the old dry ground or comminuted rubber stock under conditions excluding air, oxidation will also be effectually prevented. By thus quickly heating the dry ground scrap or waste vulcanized rubber to about 600° Fht. under hermetic conditions an isomeric change takes place and the rubber colloid resumes its original plasticity; and by again quickly cooling it further vulcanization is prevented from taking place during the treatment. In practicing my process in order to quickly heat the dry ground rubber stock to the required degree to produce plasticity and then again quickly cool it, I feed or pass the dry ground old rubber stock to be reclaimed, in a narrow stream or layer through a narrow or contracted passage, the walls of which are heated by any suitable means to the required extent to impart to the ground rubber stock moving through the narrow passage in contact with its hot walls the required degree of heat to produce the necessary plasticity to reclaim the rubber and enable it to be reworked and revulcanized. The ground or comminuted rubber stock is preferably kept constantly moving as it is forced in a narrow continuous stream or layer through the heated passage way. The passage way may be of any suitable form in cross section, but its walls must be close enough together to heat the ground or comminuted rubber stock evenly through and throughout during its movement through a given length of the heated passage, so that every particle of the ground or comminuted rubber stock will be properly and quickly heated to the required degree to produce plasticity.

Any suitable means may be employed for moving or forcing the ground rubber stock through the heated passage way, such for example as a screw or reciprocating plunger, or other feed device, I prefer however to employ a feed screw, like that of a screw conveyer, as it gives a more continuous movement to the rubber stock than that effected by a reciprocating plunger. The speed at which the feed device is operated regulates the speed of flow of the thin stream or layer of rubber waste through the heated passage.

In practice I have heretofore made the heated passage of iron or steel and about 30 inches in length, the heated walls being about one inch apart the narrowest way, and the passage being of any width desired, say 12 inches more or less. With a passage of this length and a thickness of one inch, the ground rubber stock is converted to a cohesive mass in passing at the rate of two minutes from the time of its entrance into the heated passage until discharged therefrom, the passage way being heated to about 600° Fht.

By increasing the length of the heated passage the ground rubber stock may be forced through it more rapidly, as the longer the heated passage way is the faster the rubber stock may be passed through and at the same time have imparted to it the required degree of heat. This hot passage way is inclosed on all sides and only open at one end for the admission of the unconverted stock and at the otherend for the discharge of the converted stock, these openings being of course at all times closed by the rubber stock undergoing treatment and which compactly fills the passage way from end to end. Considerable pressure is necessary to cause the rubber stock to move through the heated passage way, and this pressure compacts the rubber stock into a dense condition, thereby excluding air and preventing oxidation from that source. After being thus quickly heated from the normal temperature to the degree required to produce plasticity or reclamation, the ground rubber stock is then quickly cooled so that no time is allowed for any appreciable vulcanization to take place owing to the free sulfur always found in vulcanized rubber. This quick cooling of the ground or comminuted rubber stock may be effected in any suitable way, but preferably by a closed cooling chamber into which the hot plastic, cohesive, reclaimed rubber is discharged from the heated passage way, the cooling chamber being preferably free from oxidizing agents, such as air, water, moisture or other substances containing oxygen. The closed cooling chamber is preferably jacketed and surrounded by water or other cooling medium. After the reclaimed rubber stock is thus quickly cooled down to the temperature suitable for sheeting, it is preferably passed directly from the cooling chamber to the sheeting rolls by a suitable conveyer, which is preferably a closed one.

In operating my invention the vulcanized rubber scrap or waste is first ground in any suitable way to a fine pulverulent or comminuted state, and if it contains fiber, dirt, or other foreign matter, as is usually the case where the scrap or waste is in the form of fire hose, pneumatic tires, shoes, rubber clothing, etc., I separate the ground rubber stock from the fiber or other foreign matter, and then pass the ground and cleaned rubber stock through the narrow heated passage way, as before described.

To enable my invention to be more readily understood and practiced by those skilled in the art, I have in the accompanying drawing, forming part of this specification, illustrated one form of apparatus suitable for practicing it.

In the drawing A represents the narrow, contracted heated passage way through which the ground rubber stock is fed or passed, the same being preferably of annular form in cross section and heated in any suitable manner, preferably by means of a steam jacket $A^1$ surrounding the passage way.

B is a feed hopper in which the ground rubber stock is placed.

C is a feed device, preferably a rotating screw by which the ground rubber stock is forced into and through the heated passage way the shaft of the screw being preferably hollow and steam heated.

D is a closed cooling chamber into which the reclaimed or plastic ground rubber stock is discharged from the heated passage way. This cooling chamber is closed so that the air and other forms of oxygen or substances containing oxygen may be excluded therefrom. This cooling chamber preferably has a surrounding jacket $D^1$ containing water or other cooling medium. E E are the sheeting rolls, to which the reclaimed plastic, cohesive rubber stock is delivered directly from the cooling chamber D, this being preferably done by a screw conveyer F, having a closed trough or pipe $F^1$ so that the reclaimed, plastic, cohesive rubber stock may be kept free from oxidation until it reaches the sheeting rolls.

If it is not desired to immediately or directly sheet the reclaimed rubber stock, it may be kept in the closed cooling chamber until its temperature is reduced to the normal. But I prefer to sheet the reclaimed, plastic, cohesive rubber stock directly and to reduce its temperature by the cooling chamber only to the point or degree suitable for sheeting.

I claim:

1. The process of reclaiming scrap or waste rubber without oxidation or further vulcanization taking place, consisting in passing the dry ground rubber stock in a thin continuous stream through a narrow heated passage and thus quickly (in a few minutes) raising the temperature of the particles as they pass to the necessary degree to produce plasticity, substantially as specified.

2. The process of reclaiming scrap or waste rubber without oxidation or further vulcanization taking place, consisting in passing the dry ground rubber stock in a thin continuous stream through a narrow heated passage and thus quickly (in a few minutes) raising the temperature of the particles as they pass to the necessary degree to produce plasticity and then quickly cooling the same, substantially as specified.

3. The process of reclaiming scrap or waste rubber without oxidation or further vulcanization taking place, consisting in passing the dry ground rubber stock in a thin continuous stream through a narrow heated passage and thus quickly (in a few minutes) raising the temperature of the particles as they pass to the necessary degree to produce plasticity, then quickly cooling the same and then sheeting the same, substantially as specified.

4. The process of reclaiming scrap or waste vulcanized rubber, consisting in continually feeding or forcing the ground or comminuted rubber stock in a dry condition through a contracted or narrow heated passage way and thus quickly (in a few minutes) raising the ground rubber stock to the temperature necessary to produce plasticity and cohesion, substantially as specified.

5. The process of reclaiming scrap or waste vulcanized rubber, consisting in continually feeding or forcing the ground or comminuted rubber stock in a dry condition through a contracted or narrow heated passage way and thus quickly (in a few minutes) raising the ground rubber stock to the temperature necessary to produce plasticity and cohesion, and then cooling the same, substantially as specified.

6. The process of reclaiming scrap or waste vulcanized rubber, consisting in continuously feeding or forcing the ground or comminuted rubber stock in a dry condition through a contracted or narrow heated passage way and thus quickly (in a few minutes) raising the ground rubber stock to the temperature necessary to produce plasticity and cohesion, then cooling the same, and then sheeting the same, substantially as specified.

7. The process of reclaiming scrap or waste vulcanized rubber, consisting in continuously feeding or forcing the ground or comminuted rubber stock in a dry condition through a contracted or narrow heated passage way and thus quickly (in a few minutes) raising the ground rubber stock to the temperature necessary to produce plasticity and cohesion under conditions isolating it from air and oxygen, substantially as specified.

8. The process of reclaiming dry pulverulent vulcanized rubber, consisting in forcing it under pressure in a narrow continuous stream through a hot passage way into a hermetic cooling chamber, and thus quickly (in a few minutes) raising the temperature to the point necessary to produce plasticity and cohesion, and then quickly cooling it, substantially as specified.

9. The process of reclaiming dry pulverulent rubber scrap or waste, consisting in forcing it in a small compact continuous stream through a confined heated passage way in contact with the heated walls thereof, and thus quickly (in a few minutes) raising the moving rubber particles to the temperature necessary to give plasticity and cohesion under conditions excluding air from the heated rubber stock, substantially as specified.

10. The process of reclaiming dry pulverulent rubber scrap or waste, consisting in forcing it in a small compact continuous stream through a confined heated passage way in contact with the heated walls thereof, and thus quickly in a few minutes raising the moving rubber particles to the temperature necessary to give plasticity and cohesion under conditions excluding air from the heated rubber stock, then cooling it, substantially as specified.

11. The process of reclaiming dry pulverulent rubber scrap or waste, consisting in forcing it in a small compact continuous stream through a confined heated passage way in contact with the heated walls thereof, and thus quickly in a few minutes raising the moving rubber particles to the temperature necessary to give plasticity and cohesion under conditions excluding air from the heated rubber stock, then cooling it and then sheeting it, substantially as specified.

ORRIN A. WHEELER.

Witnesses:
H. M. MUNDAY,
J. L. BROWN.